US012431724B2

(12) United States Patent
Mora

(10) Patent No.: US 12,431,724 B2
(45) Date of Patent: Sep. 30, 2025

(54) COMBINATION DEVICE ORGANIZER AND CHARGER APPARATUS

(71) Applicant: Shaye Mora, Rock Island, IL (US)

(72) Inventor: Shaye Mora, Rock Island, IL (US)

(*) Notice: Subject to any disclaimer, the term of this patent is extended or adjusted under 35 U.S.C. 154(b) by 666 days.

(21) Appl. No.: 17/864,114

(22) Filed: Jul. 13, 2022

(65) Prior Publication Data
US 2024/0022095 A1 Jan. 18, 2024

(51) Int. Cl.
H01M 10/46 (2006.01)
H02J 7/00 (2006.01)

(52) U.S. Cl.
CPC .......... H02J 7/0044 (2013.01); H02J 7/0013 (2013.01)

(58) Field of Classification Search
CPC ....... H02J 7/0044; H02J 7/0042; H02J 7/0013
USPC .................................. 320/107, 114, 115, 116
See application file for complete search history.

(56) References Cited

U.S. PATENT DOCUMENTS

| 5,605,235 | A | 2/1997 | Johnson | |
|---|---|---|---|---|
| 7,565,968 | B2* | 7/2009 | Lindley | A62B 99/00 426/115 |
| 7,642,912 | B2 | 1/2010 | Sholem | |
| 8,847,549 | B2 | 9/2014 | Graham | |
| D720,554 | S | 1/2015 | Hardy | |
| 8,966,684 | B2 | 3/2015 | Seehoff | |
| D807,640 | S | 1/2018 | Goldszer | |
| 10,750,876 | B2 | 8/2020 | Cammack | |
| 2008/0035507 | A1* | 2/2008 | Collister | B25H 3/006 206/349 |
| 2008/0053847 | A1* | 3/2008 | Rakosky | B25H 3/02 206/216 |
| 2010/0127661 | A1* | 5/2010 | Stocking | H02J 7/0044 320/115 |
| 2010/0171465 | A1* | 7/2010 | Seal | H02J 7/0044 320/155 |
| 2018/0183250 | A1* | 6/2018 | Byrne | B65D 25/2891 |
| 2019/0373999 | A1* | 12/2019 | Nauertz | A45C 15/00 |

FOREIGN PATENT DOCUMENTS

| WO | WO-2007106471 A2 * | 9/2007 | ............. A62B 99/00 |
|---|---|---|---|
| WO | WO2007137269 | 11/2007 | |
| WO | WO-2016086274 A1 * | 6/2016 | ............... B60K 1/04 |

* cited by examiner

Primary Examiner — Edward Tso

(57) ABSTRACT

A combination device organizer and charger apparatus for holding devices on a support surface or a wall while charging chargeable devices and powering electrical devices includes a base with a concavity in a top side of the base for holding a plurality of items. A flange extends from the top side of the base aligned with a back side of the base, a back surface of the flange and the back side of the base cooperatively defining a mounting surface. An electrical socket is positioned on the base and an electrical cord extends from the base which is configured to electrically couple the electrical socket to an electrical source for charging chargeable devices and powering other electrical devices by plugging them into the electrical socket.

20 Claims, 5 Drawing Sheets

COMBINATION DEVICE ORGANIZER AND CHARGER APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to device organizers and more particularly pertains to a new device organizer for holding devices on a support surface or a wall while charging chargeable devices and powering electrical devices.

(2) Description of Related Art Including Information Disclosed Under 37 CFR 1.97 and 1.98

The prior art relates to device organizers which position mobile phones, remote controllers, and other devices in various pockets or docking stations. Some of these devices, including especially the ones with docking stations, provide electrical power for charging at least some of the devices being held. However, the prior art does not disclose a device with a flange extending from the top of a base, wherein a back surface of the flange aligns with a back side of the base, a concavity protrudes into the top side of the base for storing a plurality of items, and an electrical socket is coupled to the base which is electrically couplable to an electrical source for charging electrically chargeable devices and powering electrical devices plugged into the electrical socket on the base.

BRIEF SUMMARY OF THE INVENTION

An embodiment of the disclosure meets the needs presented above by generally comprising a base with a concavity in a top side of the base for holding a plurality of items. A flange extends from the top side of the base aligned with a back side of the base, a back surface of the flange and the back side of the base cooperatively defining a mounting surface. An electrical socket is positioned on the base and an electrical cord extends from the base which is configured to electrically couple the electrical socket to an electrical source for charging chargeable devices and powering other electrical devices by plugging them into the electrical socket.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
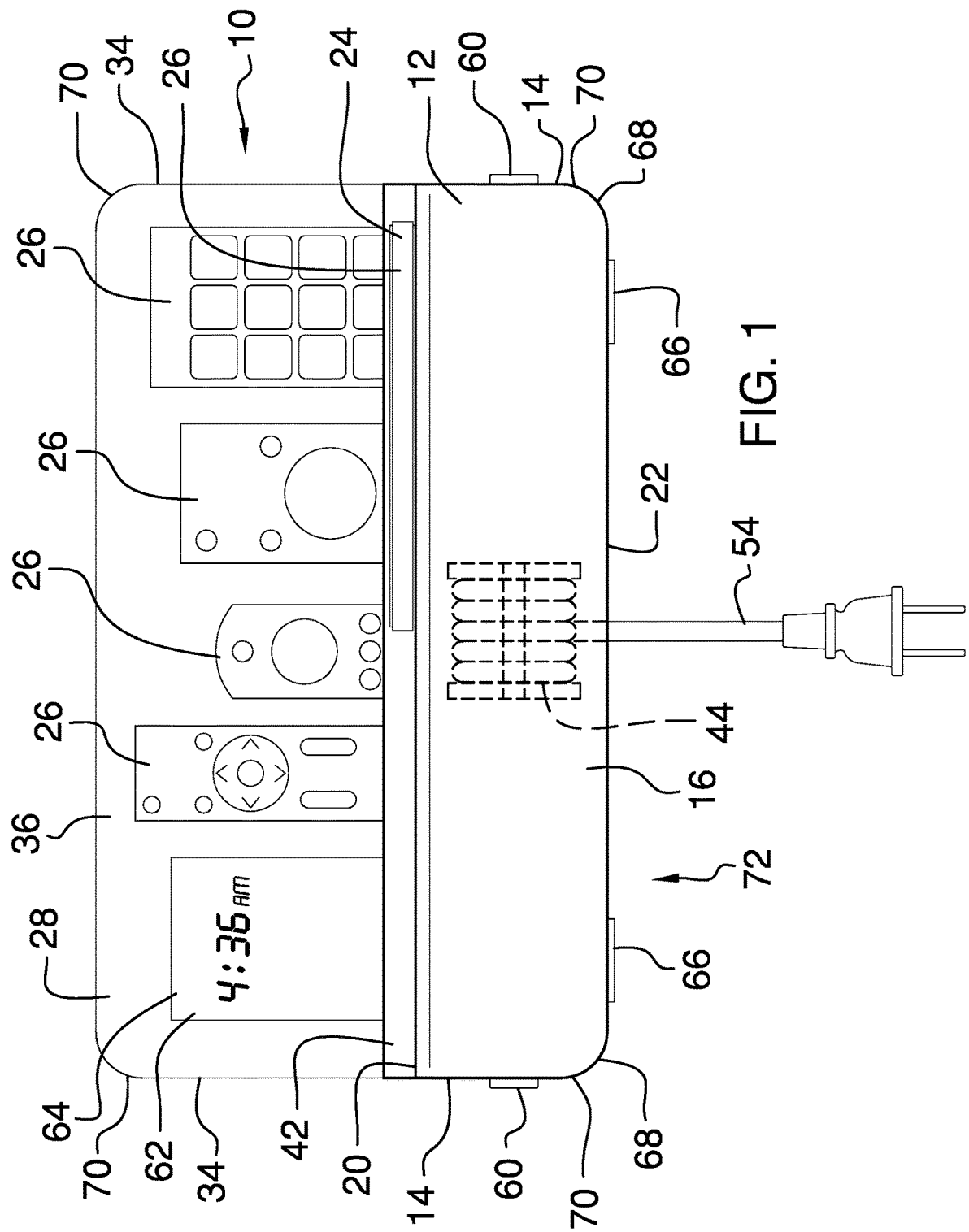
FIG. 1 is a front in-use view of a combination device organizer and charger apparatus according to an embodiment of the disclosure.
Figure 2:
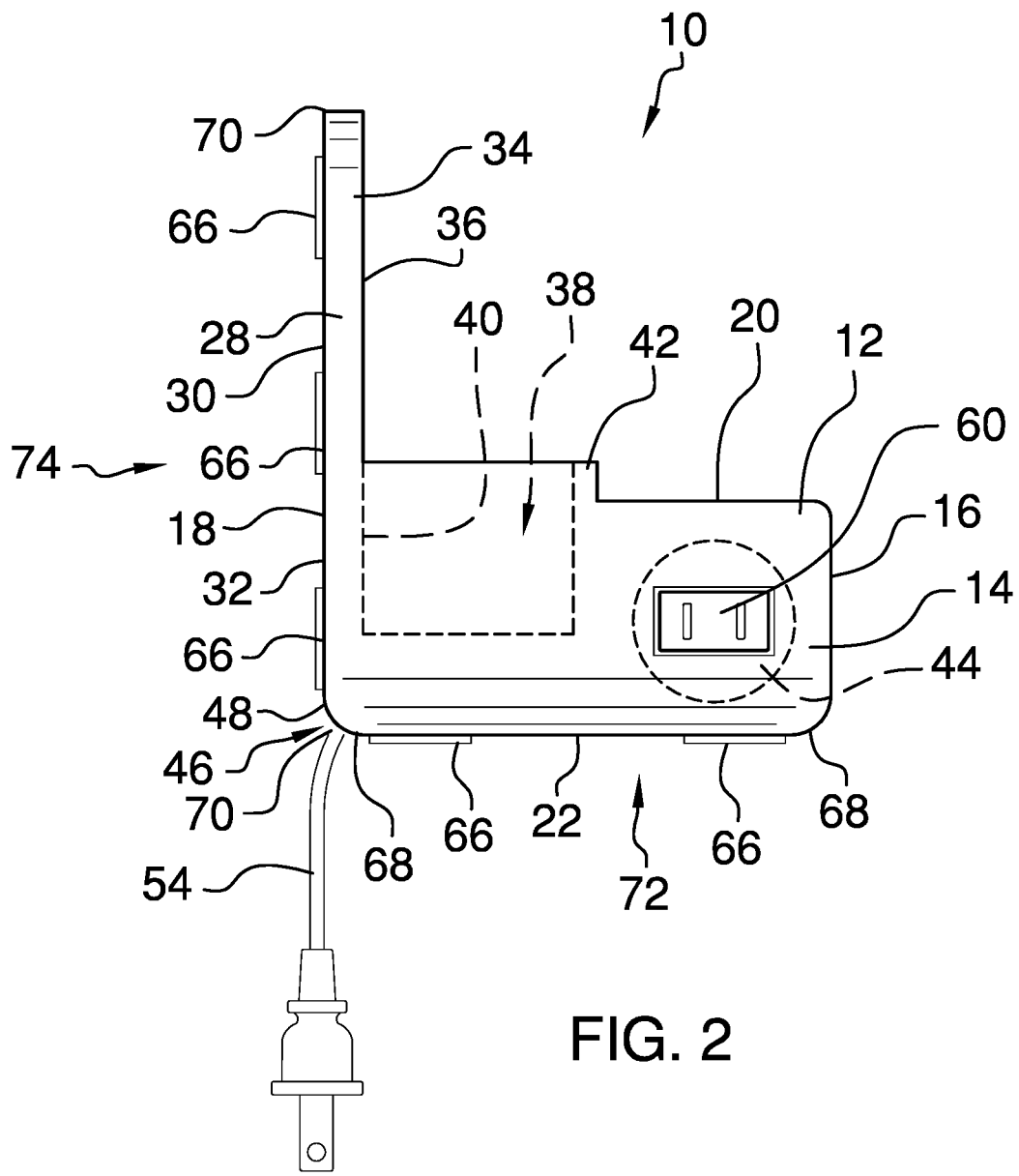
FIG. 2 is a left side view of an embodiment of the disclosure.
Figure 3:
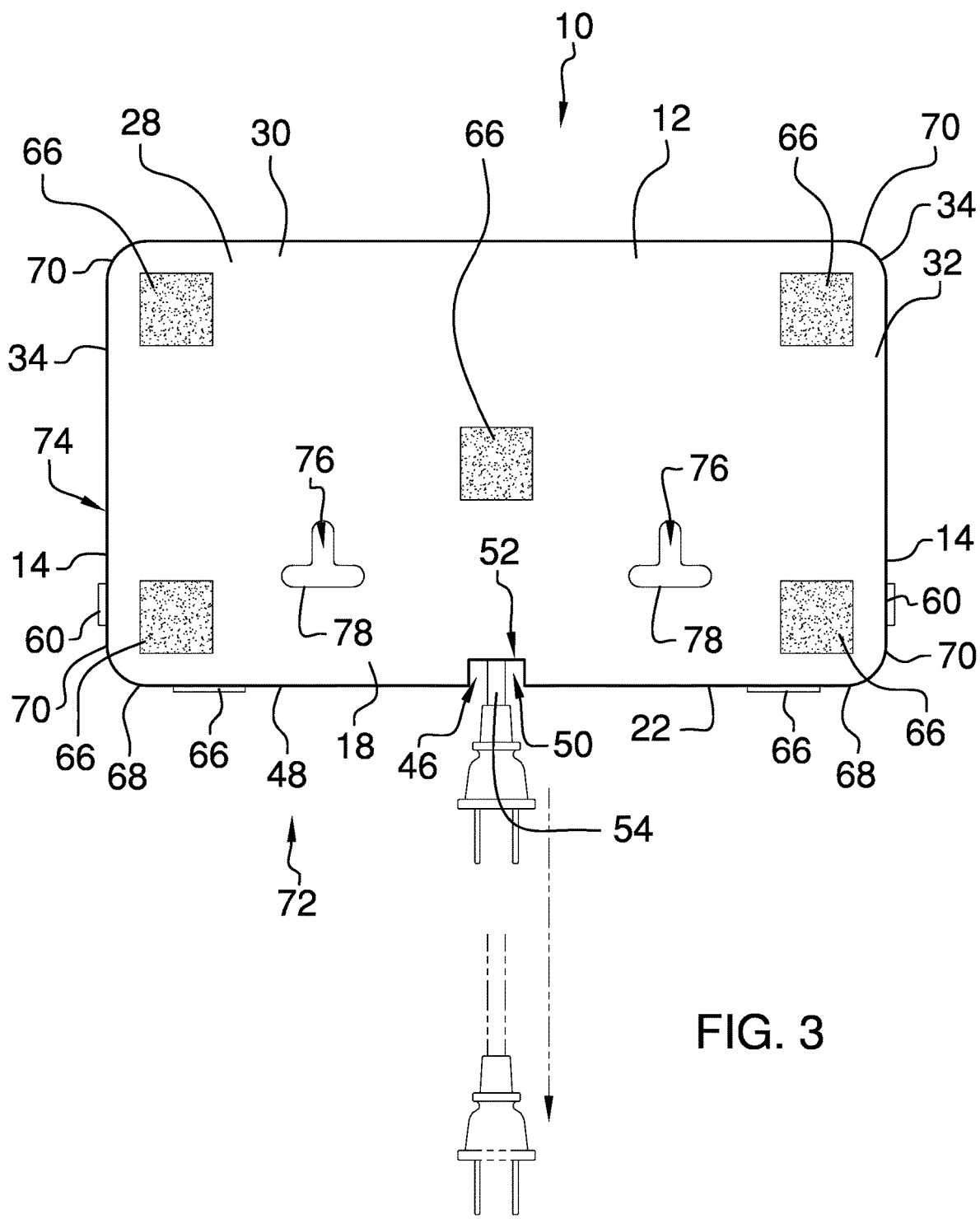
FIG. 3 is a back view of an embodiment of the disclosure.
Figure 4:
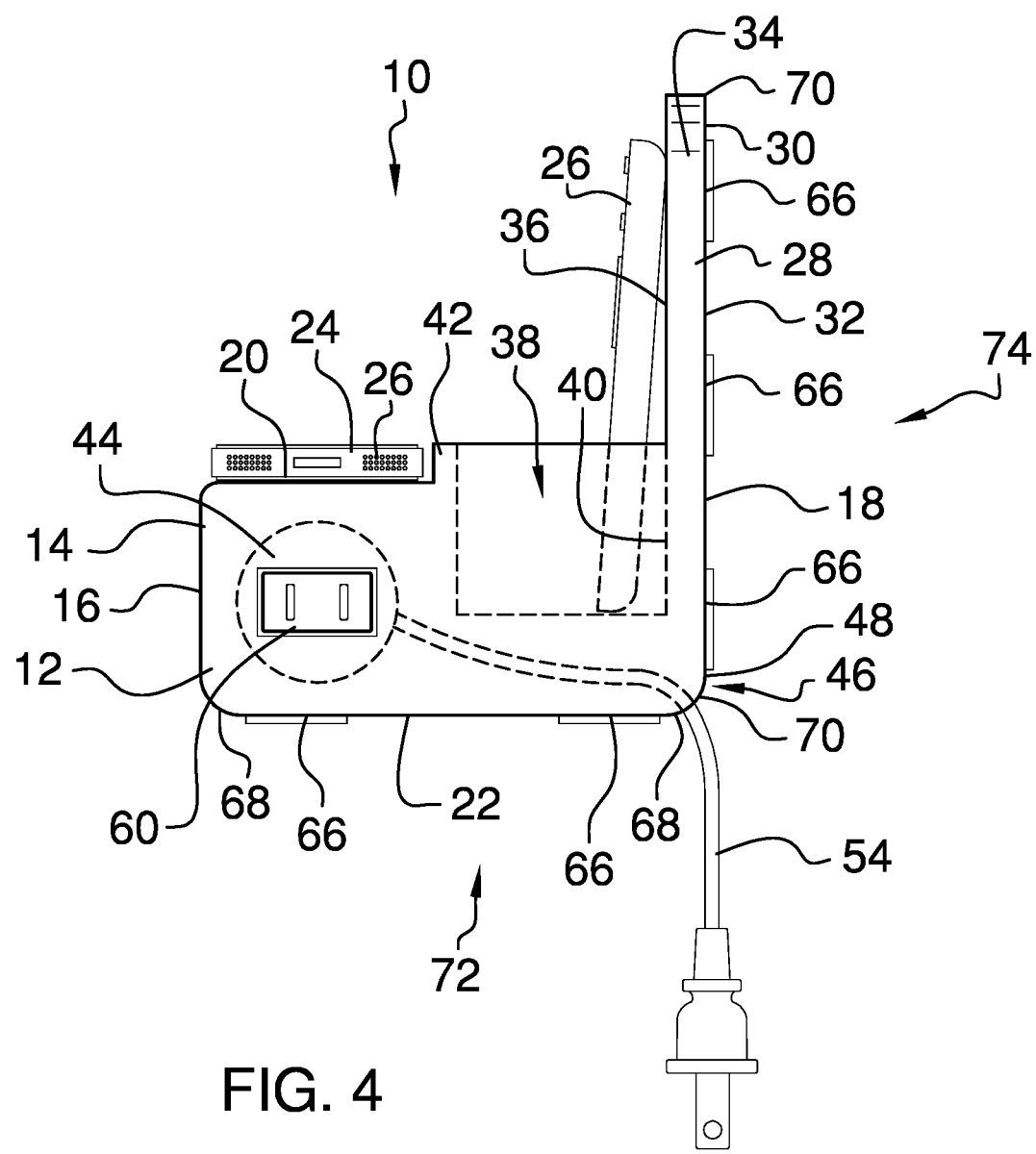
FIG. 4 is a right side in-use view of an embodiment of the disclosure.
Figure 5:
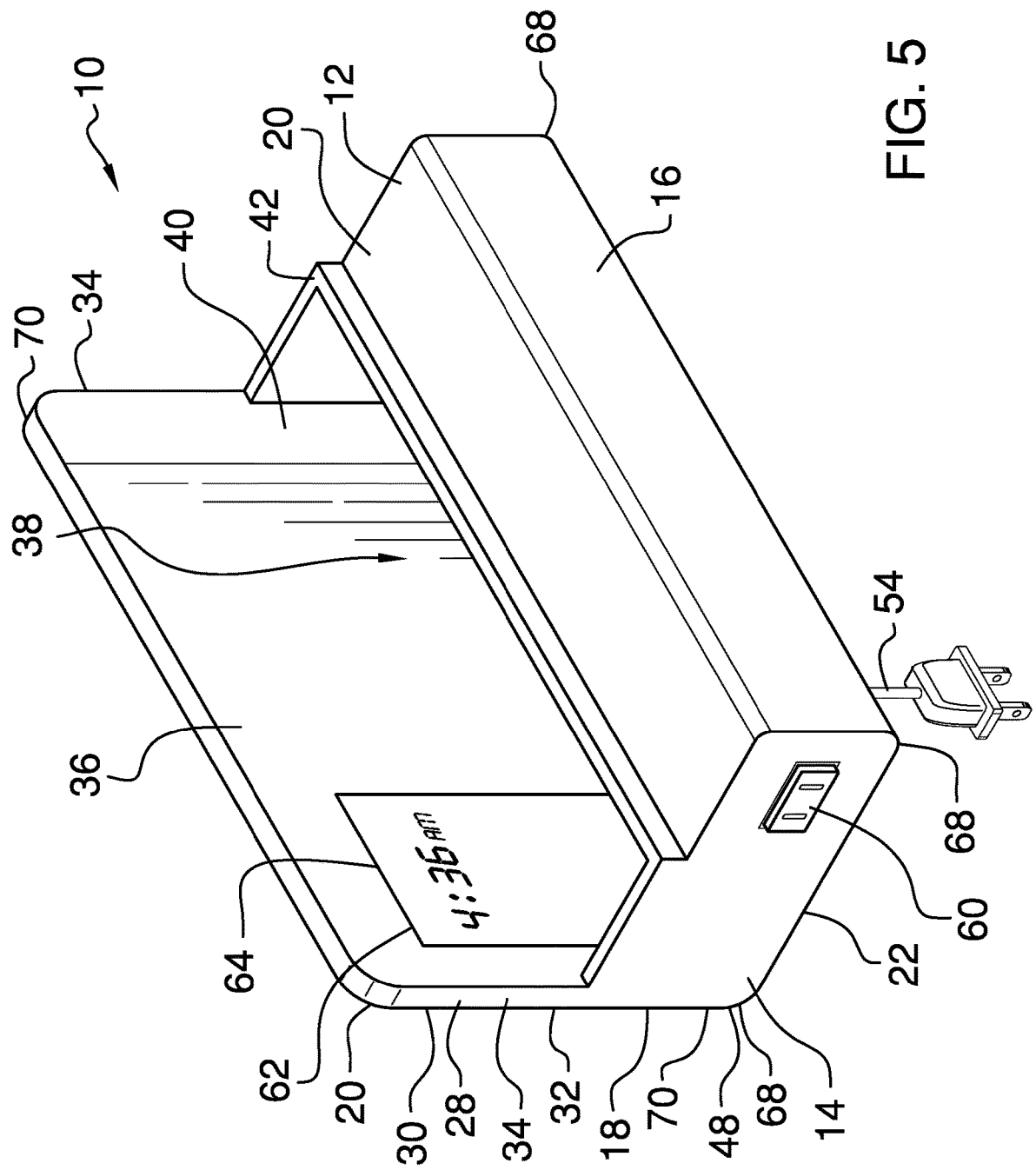
FIG. 5 is a front top side perspective view of an embodiment of the disclosure.

With reference now to the drawings, and in particular to FIGS. 1 through 5 thereof, a new device organizer embodying the principles and concepts of an embodiment of the disclosure and generally designated by the reference numeral 10 will be described.

As best illustrated in FIGS. 1 through 5, the combination device organizer and charger apparatus 10 generally comprises a hollow base 12 having a pair of lateral sides 14 and a front side 16 and a back side 18, each of the front side 16 and the back side 18 extending between the pair of lateral sides 14. The base 12 also has a top side 20 and a bottom side 22, each which extend between the pair of lateral sides 14 and between the front side 16 and the back side 18. The top side 20 is planar and is configured for supporting a mobile phone 24. A concavity 38 extends into the top side 20 of the base 12 toward the bottom side 22 of the base 12 and is configured for holding a plurality of items 26. Typical items 26 for holding in the apparatus 10 include mobile phones 24, remotes, portable music players, eyeglasses, lip 42 balm, chargeable devices and the like.

A flange 28 is coupled to and extends from the top side 20 of the base 12. The flange 28 has a back surface 30 which is aligned with the back side 18 of the base 12. The back surface 30 of the flange 28 and the back side 18 of the base 12 cooperatively define a mounting surface 32. The flange 28 has a pair of lateral surfaces 34, each of which is aligned with an associated lateral side 14 of the pair of lateral sides 14 of the base 12. The flange 28 also has a front surface 36 opposing the back surface 30 and aligning with a back side 40 of the concavity 38. A lip 42 is coupled to and protrudes away from the top side 20 of the base 12 around the concavity 38 from one lateral surface 34 of the flange 28 to the other lateral surface 34 of the flange 28.

A self-retracting reel 44 is rotationally coupled to and positioned within the base 12. The self-retracting reel 44 is positioned between the concavity 38 and the front side 16 of the base 12. The self-retracting reel 44 is centered between the pair of lateral sides 14 of the base 12 and is rotatable about a rotational axis that is perpendicular to each lateral side 14 of the base 12. An aperture 46 extends through an edge 48 of the bottom side 22 of the base 12 and the back side 18 of the base 12. The aperture 46 has a bottom portion 50 extending through the bottom side 22 of the base 12 and a back portion 52 extending through the back side 18 of the base 12. An electrical cord 54 is wound around the self-retracting reel 44 and extends through the aperture 46. The electrical cord 54 extends through the bottom portion 50 of the aperture 46 when the mounting surface 32 secures to a wall and extends through the back portion 52 of the aperture 46 when the bottom side 22 of the base 12 is positioned on a support surface. The electrical cord 54 is configured for electrically coupling to an electrical source and for receiving an electrical power from the electrical source when electrically coupled to the electrical source.

Each of a pair of electrical sockets 60 is positioned in a respective one of the pair of lateral sides 14 of the base 12 between the concavity 38 and the front side 16 of the base 12. Each electrical socket 60 is electrically coupled to the electrical cord 54 and is configured for electrically coupling the electrical cord 54 to a chargeable device, thereby charging the chargeable device when the electrical cord 54 is electrically coupled to the electrical source.

A clock 62 is positioned within the flange 28 and is electrically coupled to the electrical cord 54. The clock 62 is configured to activate when the electrical cord 54 is electrically coupled to the electrical source and to determine a time. The clock 62 has a display 64 on the front surface 36 of the flange 28 proximate one of the lateral surfaces 34 of the flange 28 which displays the time when activated.

A first portion 72 of a plurality of adhesives 66 is coupled to the bottom side 22 of the base 12 and a second portion 74 of the plurality of adhesives 66 is coupled to the mounting surface 32. Each adhesive 66 of the first portion 72 of the plurality of adhesives 66 is positioned proximate an associated corner 68 of a plurality of corners 68 of the bottom side 22 of the base 12. One adhesive 66 of the second portion 74 of the plurality of adhesives 66 is centered on the mounting surface 32, while the other adhesives 66 of the second portion 74 of the plurality of adhesives 66 are positioned proximate an associated corner 70 of a plurality of corners 70 of the mounting surface 32. The first portion 72 of the plurality of adhesives 66 is configured for securing the base 12 to the support surface, and the second portion 74 of the plurality of adhesives 66 is configured for securing the base 12 to the wall.

Each of a pair of mounting holes 76 is positioned on the mounting surface 32. The bottom side 22 of the base 12 is equidistant from each mounting hole 76. Each mount hole is T-shaped, and the edge 78 of each mounting hole 76 closest to the bottom side 22 of the base 12 is parallel to the bottom side 22 of the base 12. The pair of mounting holes 76 is configured for hanging on a pair of fasteners.

In use, the apparatus 10 is placed on the support surface or secured to the wall. If placed on a support surface, the first portion 72 of the plurality of adhesives 66 may secure the apparatus 10 to the support surface. To secure the apparatus 10 to the wall, the pair of mounting holes 76 may be hung on a pair of fasteners in the wall, or the second portion 74 of the plurality of adhesives 66 may secure the apparatus 10 to the wall. The electrical cord 54 is electrically coupled to the electrical source, which is at least partially unwound from the self-retracting reel 44 if necessary. While electrically coupled to the electrical source, the electrical cord 54 activates the clock 62, which displays the time, and electrically couples each of the electrical sockets 60 to the electrical source. Chargeable devices are electrically coupled to the electrical source via the electrical cord 54 and an electrical socket 60 as desired to charge the devices, and other electrical devices including lamps, radios, stereos, and the like may be electrically coupled in the same manner to power these electrical devices. The plurality of items 26 is held in the concavity 38 as desired, and the mobile phone 24 is placed on the top of the base 12 as desired. When it is desirable to move the apparatus 10 to a new location or decouple the device from the electrical source, the electrical cord 54 may be unplugged, whereby the self-retracting reel 44 will retract the electrical cord 54 to wind around the self-retracting reel 44.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A combination device organizer and charger apparatus comprising:
   a base, said base having a pair of lateral sides, said base having a front side and a back side, each of said front side and said back side extending between said pair of lateral sides, said base having a top side and a bottom side, each of said top side and said bottom side extending between said pair of lateral sides and between said front side and said back side;
   a concavity, said concavity extending into said top side toward said bottom side, said concavity being configured for holding a plurality of items;
   a flange, said flange being coupled to and extending from said top side of said base, said flange having a back surface being aligned with said back side of said base, said back surface of said flange and said back side of said base cooperatively defining a mounting surface;
   an electrical cord, said electrical cord extending from said base, said electrical cord being configured for electrically coupling to an electrical source, said electrical cord being configured for receiving an electrical power from the electrical source when electrically coupled to the electrical source;

an electrical socket, said electrical socket being positioned in one of said pair of lateral sides of said base, said electrical socket being electrically coupled to said electrical cord, said electrical socket being configured for electrically coupling said electrical cord to a chargeable device, thereby charging the chargeable device when said electrical cord is electrically coupled to the electrical source.

2. The apparatus of claim 1, further comprising:

a self-retracting reel, said base being hollow, said self-retracting reel being rotationally coupled to and positioned within said base; and an aperture, said aperture extending through said base, said electrical cord being wound around said self-retracting reel and extending through said aperture.

3. The apparatus of claim 2, further comprising said self-retracting reel being positioned between said concavity and said front side of said base.

4. The apparatus of claim 3, further comprising said self-retracting reel being rotatable about a rotational axis, said rotational axis being perpendicular to each said lateral side of said base, said self-retracting reel being centered between said pair of lateral sides of said base.

5. The apparatus of claim 2, further comprising said aperture extending through an edge of said bottom side of said base and said back side of said base, said aperture having a bottom portion extending through said bottom side of said base, said aperture having a back portion extending through said back side of said base, said electrical cord extending through said bottom portion of said aperture when said mounting surface secures to a wall, said electrical cord extending through said back portion of said aperture when said bottom side of said base is positioned on a support surface.

6. The apparatus of claim 1, further comprising said electrical socket being one of a pair of electrical sockets, each said electrical socket being positioned in a respective one of said pair of lateral sides of said base, each said electrical socket being electrically coupled to said electrical cord, each said electrical socket being configured for electrically coupling said electrical cord to a chargeable device, thereby charging the chargeable device when said electrical cord is electrically coupled to the electrical source.

7. The apparatus of claim 6, further comprising each said electrical socket being positioned between said concavity and said front side of said base.

8. The apparatus of claim 1, further comprising said flange having a front surface opposing said back surface and being aligned with a back side of said concavity.

9. The apparatus of claim 8, further comprising a lip, said flange having a pair of lateral surfaces, each of said lateral surface of said flange being aligned with an associated lateral side of said pair of lateral sides of said base, said lip being coupled to and protruding away from said top side of said base around said concavity from one lateral surface of said flange to said other lateral surface of said flange.

10. The apparatus of claim 1, further comprising said top side of said base being planar, said top side being configured for supporting a mobile phone.

11. The apparatus of claim 1, further comprising a clock, said clock being positioned within said flange, said clock being electrically coupled to said electrical cord, said clock being configured to activate when said electrical cord is electrically coupled to the electrical source, said clock being configured to determine a time, said clock having a display on the front surface of the flange, said display displaying the time when activated.

12. The apparatus of claim 11, further comprising said display of said clock being positioned proximate one of said lateral surfaces of said flange.

13. The apparatus of claim 1, further comprising a plurality of adhesives, a first portion of said plurality of adhesives being coupled to said bottom side of said base, a second portion of said plurality of adhesives being coupled to said mounting surface, said first portion of said plurality of adhesives being configured for securing said base to the support surface, said second portion of said plurality of adhesives being configured for securing said base to the wall.

14. The apparatus of claim 13, further comprising each said adhesive of said first portion of said plurality of adhesives being positioned proximate an associated corner of a plurality of corners of said bottom side of said base.

15. The apparatus of claim 13, further comprising one said adhesive of said second portion of said plurality of adhesives being centered on said mounting surface, said other adhesives of said second portion of said plurality of adhesives being positioned proximate an associated corner of a plurality of corners of said mounting surface.

16. The apparatus of claim 1, further comprising a mount hole, said mount hole being positioned on said mounting surface, said mounting hole being configured for hanging on a fastener.

17. The apparatus of claim 16, further comprising said mount hole being one of a pair of mounting holes, each mounting hole being positioned on said mounting surface, said pair of mounting holes being configured for hanging on a pair of fasteners.

18. The apparatus of claim 17, further comprising said bottom side of said base being equidistant from each said mounting hole.

19. The apparatus of claim 18, further comprising each said mount hole being T-shaped, said edge of each said mounting hole closest to said bottom side of said base being parallel to said bottom side of said base.

20. A combination device organizer and charger apparatus comprising:

a base, said base having a pair of lateral sides, said base having a front side and a back side, each of said front side and said back side extending between said pair of lateral sides, said base having a top side and a bottom side, each of said top side and said bottom side extending between said pair of lateral sides and between said front side and said back side, said top side being planar, said top side being configured for supporting a mobile phone, said base being hollow;

a concavity, said concavity extending into said top side toward said bottom side, said concavity being configured for holding a plurality of items;

a flange, said flange being coupled to and extending from said top side of said base, said flange having a back surface being aligned with said back side of said base, said back surface of said flange and said back side of said base cooperatively defining a mounting surface, said flange having a pair of lateral surfaces, each of said lateral surface of said flange being aligned with an associated lateral side of said pair of lateral sides of said base, said flange having a front surface opposing said back surface and being aligned with a back side of said concavity;

a lip, said lip being coupled to and protruding away from said top side of said base around said concavity from one lateral surface of said flange to said other lateral surface of said flange;

a self-retracting reel, said self-retracting reel being rotationally coupled to and positioned within said base, said self-retracting reel being positioned between said concavity and said front side of said base, said self-retracting reel being rotatable about a rotational axis, said rotational axis being perpendicular to each said lateral side of said base, said self-retracting reel being centered between said pair of lateral sides of said base;

an aperture, said aperture extending through an edge of said bottom side of said base and said back side of said base, said aperture having a bottom portion extending through said bottom side of said base, said aperture having a back portion extending through said back side of said base;

an electrical cord, said electrical cord being wound around said self-retracting reel and extending through said aperture, said electrical cord extending through said bottom portion of said aperture when said mounting surface secures to a wall, said electrical cord extending through said back portion of said aperture when said bottom side of said base is positioned on a support surface, said electrical cord being configured for electrically coupling to an electrical source, said electrical cord being configured for receiving an electrical power from the electrical source when electrically coupled to the electrical source;

a pair of electrical sockets, each said electrical socket being positioned in a respective one of said pair of lateral sides of said base, each said electrical socket being positioned between said concavity and said front side of said base, each said electrical socket being electrically coupled to said electrical cord, each said electrical socket being configured for electrically coupling said electrical cord to a chargeable device, thereby charging the chargeable device when said electrical cord is electrically coupled to the electrical source;

a clock, said clock being positioned within said flange, said clock being electrically coupled to said electrical cord, said clock being configured to activate when said electrical cord is electrically coupled to the electrical source, said clock being configured to determine a time, said clock having a display on the front surface of the flange proximate one of said lateral surfaces of said flange, said display displaying the time when activated;

a plurality of adhesives, a first portion of said plurality of adhesives being coupled to said bottom side of said base, a second portion of said plurality of adhesives being coupled to said mounting surface, each said adhesive of said first portion of said plurality of adhesives being positioned proximate an associated corner of a plurality of corners of said bottom side of said base, one said adhesive of said second portion of said plurality of adhesives being centered on said mounting surface, said other adhesives of said second portion of said plurality of adhesives being positioned proximate an associated corner of a plurality of corners of said mounting surface, said first portion of said plurality of adhesives being configured for securing said base to the support surface, said second portion of said plurality of adhesives being configured for securing said base to the wall; and a pair of mounting holes, each mounting hole being positioned on said mounting surface, said bottom side of said base being equidistant from each said mounting hole, each said mount hole being T-shaped, said edge of each said mounting hole closest to said bottom side of said base being parallel to said bottom side of said base, said pair of mounting holes being configured for hanging on a pair of fasteners.

\* \* \* \* \*